United States Patent
Yin et al.

(10) Patent No.: US 10,677,700 B2
(45) Date of Patent: Jun. 9, 2020

(54) METHOD FOR TESTING PERFORMANCE OF DIAMOND SAW BLADE, DIAMOND GRINDING WHEEL AND DIAMOND DRILL BIT

(71) Applicant: CHENGDU HUIFENG NEW MATERIAL TECHNOLOGY CO., LTD, Chengdu, Sichuan (CN)

(72) Inventors: Ding Yin, Sichuan (CN); Hehui Guo, Sichuan (CN); Hui Zou, Sichuan (CN)

(73) Assignee: CHENGDU HUIFENG NEW MATERIAL TECHNOLOGY CO., LTD, Chengdu, Sichuan (CN)

( * ) Notice: Subject to any disclaimer, the term of this patent is extended or adjusted under 35 U.S.C. 154(b) by 261 days.

(21) Appl. No.: 15/774,585

(22) PCT Filed: Apr. 26, 2017

(86) PCT No.: PCT/CN2017/081945
§ 371 (c)(1),
(2) Date: May 8, 2018

(87) PCT Pub. No.: WO2017/186111
PCT Pub. Date: Nov. 2, 2017

(65) Prior Publication Data
US 2018/0321119 A1 Nov. 8, 2018

(30) Foreign Application Priority Data

Apr. 29, 2016 (CN) .......................... 2016 1 0277909

(51) Int. Cl.
*G01N 3/56* (2006.01)
*G01N 3/58* (2006.01)

(52) U.S. Cl.
CPC ................. *G01N 3/56* (2013.01); *G01N 3/58* (2013.01)

(58) Field of Classification Search
CPC .................................... G01N 3/56; G01N 3/58
See application file for complete search history.

(56) References Cited

U.S. PATENT DOCUMENTS

| | | | | |
|---|---|---|---|---|
| 2,055,125 A | * | 9/1936 | Ernest | G01N 3/58 73/104 |
| 3,897,166 A | * | 7/1975 | Adams | A61B 17/16 408/14 |

(Continued)

FOREIGN PATENT DOCUMENTS

JP 2019093469 A * 6/2019 ............... G01N 3/58

*Primary Examiner* — Nguyen Q. Ha

(57) ABSTRACT

A method for testing cutting performance of a diamond saw blade, relating to a technical field of diamond tool test, is provided, which solves problems of inaccuracy and non-uniformity existing in conventional methods for testing cutting performance of a diamond tool. The method includes steps of: (1) obtaining a set load parameter value, particularly including steps of: controlling a feed amount of the diamond saw blade; finding out a load value K corresponding to a maximum feed amount of the diamond saw blade on a cutting object; and setting M=0.70K-0.85K, wherein M is the set load parameter value; and (2) during cutting, controlling a cutting load value of the diamond saw blade to be 0.90M-1.1M through a servo system. Therefore, uniform three cutting elements of machine and tool, object, and feed thrust are realized, and the performance of the diamond tool is automatically and accurately measured.

10 Claims, 5 Drawing Sheets

(56) References Cited

U.S. PATENT DOCUMENTS

| | | | | |
|---|---|---|---|---|
| 4,178,797 | A | * | 12/1979 | Kozlowski, Jr. ......... G01N 3/58 73/104 |
| 4,228,514 | A | * | 10/1980 | Weiss ....................... G01N 3/58 702/34 |
| 5,115,403 | A | * | 5/1992 | Yoneda ................. B23D 59/001 700/173 |
| 5,379,633 | A | * | 1/1995 | Flisram ................. G01L 5/0028 73/104 |
| 5,571,956 | A | * | 11/1996 | Sargent ................... G01N 3/58 73/104 |
| 2006/0201237 | A1 | * | 9/2006 | Dowd ..................... G01N 3/58 73/104 |
| 2018/0313731 | A1 | * | 11/2018 | Dowd ................... G01L 5/0061 |
| 2019/0277741 | A1 | * | 9/2019 | Staub ....................... G01N 3/58 |

* cited by examiner

METHOD FOR TESTING PERFORMANCE OF DIAMOND SAW BLADE, DIAMOND GRINDING WHEEL AND DIAMOND DRILL BIT

CROSS REFERENCE OF RELATED APPLICATION

This is a U.S. National Stage under 35 U.S.C. 371 of the International Application PCT/CN2017/081945, filed Apr. 26, 2017, which claims priority under 35 U.S.C. 119(a-d) to CN 201610277909.0, filed Apr. 29, 2016.

BACKGROUND OF THE PRESENT INVENTION

Field of Invention

The present invention relates to a technical field of diamond tool test, and more particularly to a method for testing cutting performance of a diamond saw blade.

Description of Related Arts

The national standard, GB/T11270 *Abrasive products-Diamond circular saw blade*, is one of the technical standards meaning that the super-hard tool field in China becomes closer to the international standard and having the certain level. However, the above national standard does not make the qualitative or quantitative standard for the important cutting performance of the actual usage performances of the diamond circular saw blade.

The cutting performance of the diamond circular saw blade is the core performance index of the diamond circular saw blade. Whether the cutting performance of the saw blade is good or bad is determined by the performances of the saw blade on the indexes such as speed, load, consumption, residual tailing and boundary effect when actually cutting the particular object. Generally, machine and tool, object, and feed thrust are called three elements of cutting for short, which have the great influence on the results of the cutting test. Therefore, the three elements should be uniform as far as possible, so as to conform to the basic principle of equal condition test.

The first element of machine and tool can be realized through unifying the rotation speed and the second element of object can be uniform through the detailed agreement, while the difficulty lies in the control of the third element of feed thrust. For a long time, the various saw blade manufacturers have been continuously exploring the fair, objective and scientific cutting test method. Until now, there are many cutting test methods, such as the manual feed method, the constant force cutting test method (namely feeding with hanging weight), the limited power (current) cutting test method, and the constant value feed cutting test method. However, all the above methods are less than satisfactory.

The manual feed method has the problem of instability and is greatly related to the skill, physical ability and experience of the operators. Even with the same machine table and the same cutting tool, it is difficult to realize the uniform feed thrust, let alone the uniform feed thrust of different cutting tools when testing at two places.

The constant force cutting test method (namely feeding with hanging weight), the limited power (current) cutting test method and the constant value feed cutting test method all belong to the rigid constant force test methods. Although the rigid constant force cutting method is able to solve the randomness problem existing in the manual feed method, the rigid constant force cutting method will either cause the test damage to the tested saw blade due to the relatively large set workload (namely too large hanging weight) or fail to release the potential of the tested saw blade due to the relatively small set workload (namely too small hanging weight), resulting in the non-objective test results. Moreover, for the conventional methods, the important parameters such as the working tooth consumption value, the cutting amount and the time consumption are generally manually measured, causing the inaccurate measurement and results.

The above problems also exist in the diamond grinding wheel and the diamond drill bit. During the test process of the diamond drill bit and the diamond grinding wheel, the rigid constant force drilling and grinding are adopted, which either causes the test damage to the tested drill bit and grinding wheel due to the relatively large set workload (namely too large hanging weight) or fails to release the potential of the tested drill bit and grinding wheel due to the relatively small set workload (namely too small hanging weight), resulting in the non-objective test results. Moreover, the important parameters such as the working tooth consumption value, the drilling amount (grinding amount) and the time consumption are generally manually measured, causing the inaccurate measurement and results.

In conclusion, the existing technology is unable to accurately test the performances of the diamond saw blade, the diamond grinding wheel and the diamond drill bit. With the gradual improvement of the diamond saw blade (grinding wheel and drill bit) industry in China, it is urgent to develop a uniform and normative test standard, so as to ensure the industrial healthy development.

SUMMARY OF THE PRESENT INVENTION

An object of the present invention is to provide a method for testing cutting performance of a diamond saw blade, so as to solve inaccuracy and non-uniformity problems existing in conventional methods for testing cutting performance of diamond saw blade, for testing grinding performance of diamond grinding wheel and for testing drilling performance of diamond drill bit. According to the present invention, an alternating current servo motor and a programmable logic controller (PLC) form an accurate, sensitive and reliable control and test system, and a dynamic closed-loop servo mode of a cutting process is skillfully established, thereby modulating a feed speed timely, stabilizing a cutting load (namely a feed thrust) and being self-adaptive to a condition change due to an uneven cutting material structure and an uneven own performance of a saw blade working tooth, so that the saw blade works in an optimal state and intelligent cutting is realized. Moreover, according to the present invention, automatic measurement of various parameters is realized, so that working performance of the diamond saw blade can be accurately obtained. The present invention not only realizes flexible intelligent cutting test with reliable data but also solves a difficult problem of great difference of manual cutting.

Compared with conventional test methods, the method provided by the present invention is able to accurately test the cutting performance of the diamond saw blade, the grinding performance of the diamond grinding wheel and the drilling performance of the diamond drill bit, so that the testing method of the performances of the diamond saw blade, drill bit and grinding wheel becomes uniform and a test standard is formed in industry. The present invention is not only applicable to diamond cutting, grinding and drilling tools, but is also applicable to the performance test of the cutting, grinding and drilling tools of other materials.

In order to solve the above technical problems, following technical solutions are adopted by the present invention.

A method for testing cutting performance of a diamond saw blade comprises steps of:

(1) starting a cutting machine, idling the cutting machine with a low speed, and ensuring that the cutting machine runs normally;

(2) according to a structure of the saw blade, selecting dry cutting (without cooling liquid) or wet cutting (with cooling liquid);

(3) arranging the diamond saw blade on the cutting machine, and ensuring that a rotation direction of the diamond saw blade is same as a rotation direction of a main shaft of the cutting machine;

(4) according to a function of the diamond saw blade, selecting an appropriate cutting object; arranging the selected cutting object on a material conveying table, and setting a material conveying distance;

(5) starting the cutting machine, and automatically measuring a height value of a working tooth of the saw blade before cutting by the cutting machine; manually feeding with a feed speed adjusted from low to high, and finding out a load value K corresponding to a maximum feed amount of the diamond saw blade; and setting M=0.70K-0.85K, wherein M is a set load parameter value;

(6) when the diamond saw blade contacts the cutting object, starting timing and distance measurement at the same time; cutting until the saw blade leaves from the cutting object, and instantly ending timing and distance measurement; wherein: during cutting, a cutting load value of the diamond saw blade is controlled to be 0.9M-1.1M through a servo system, so as to realize intelligent cutting; and that is to say, the cutting load value fluctuates around the set load parameter value, so as to enable a cutting thrust to be flexibly constant; and (7) automatically measuring a consumption value of the working tooth and a cutting amount, and automatically timing; according to a cutting length and a cutting time, calculating a sharpness of the diamond saw blade; and, according to the cutting length and a consumed tooth height of the diamond saw blade during cutting, calculating a working life of the diamond saw blade.

In order to avoid the test being interfered due to blocked debris, a cutting depth is required to be larger than a thickness of the cutting object by 2 mm.

An accumulative test cutting length of the diamond saw blade is required to be no less than 10 m; and the cutting time during manual feeding is not involved in calculation of the sharpness.

If a comparison test is made for testing the cutting performances of more than two diamond saw blades, the saw blades should be tested on the same cutting object under the same condition for certain times.

When the cutting object is ceramic tile or marble, the residual tailing and boundary effect should be observed.

During cutting, an overload resistance of the diamond saw blade can be tested through continuously or intermittently increasing the feed amount.

The present invention is also applicable to performance tests of diamond grinding wheel and diamond drill bit. Test principles of the diamond grinding wheel and the diamond drill bit are same as that of the diamond saw blade. That is to say, the set load parameter value is firstly obtained, particularly comprising steps of: manually controlling the feed amount of the tool; finding out the load value K corresponding to the maximum feed amount of the tool on the test object; and setting M=0.70K-0.85K, wherein M is the set load parameter value. Thereafter, the load value of the tool is controlled to be 0.90M-1.1M through the servo system during testing; and finally, the performances of the tool are calculated according to the test data.

A method for testing grinding performance of a diamond grinding wheel comprises steps of:

(1) automatically calibrating, and measuring a height value of a working tooth of the grinding wheel before grinding;

(2) obtaining a set load parameter value, particularly comprising steps of: controlling a feed amount of the diamond grinding wheel; finding out a load value K corresponding to a maximum feed amount of the diamond grinding wheel on a grinding object; and setting M=0.70K-0.85K, wherein M is the set load parameter value;

(3) during grinding, controlling a grinding load value of the diamond grinding wheel to be 0.90M-1.1M through a servo system, wherein the grinding load value fluctuates around the set load parameter value, so as to enable a grinding thrust to be flexibly constant and realize intelligent grinding; and (4) automatically measuring related parameters; according to a grinding volume and a grinding time of the grinding object, obtaining a grinding sharpness of the diamond grinding wheel; and, according to the grinding volume of the grinding object and a consumption value of a tooth height of the grinding wheel after grinding, calculating a working life of the diamond grinding wheel.

Before obtaining the set load parameter value, a mark is made on a circumference of the grinding wheel and serves as a measurement position of tooth height consumption before grinding and after grinding. Before starting grinding, the grinding object is arranged and fixed on a material conveying table; then a start button is pressed; the grinding wheel enters an automatic calibration program; a feed mechanism drives the diamond grinding wheel to move vertically; after the grinding wheel contacts the grinding object, a depth probe is put down and contacts the grinding object for recording a depth scale ($Xq1$), and meanwhile when the depth probe contacts the grinding object, the scale of the depth probe returns to zero to serve as a feed start position ($Hq$); then the depth probe returns back, and the automatic calibration is completed.

During grinding, the diamond grinding wheel grinds the grinding object with feeding in an "S" shape circularly, and a grinding completion time is recorded.

After completing a set accumulative grinding depth, the grinding test automatically enters a measurement program for measuring the working tooth consumption and the removal amount of the grinding material. The feed mechanism returns back to a start position and then drives the grinding wheel to move; after the grinding wheel contacts the grinding object, a depth scale value ($Xh1$) is recorded; and meanwhile, the depth probe moves to successively contact four angular points of the grinding object and respectively records scale values thereof for calculating an average value of the scale values of the depth probe, so that a depth removal value ($Hh$) of the grinding material after grinding is obtained; the depth probe returns back, and the measurement is completed.

A method for testing drilling performance of a diamond drill bit comprises steps of:

(1) automatically calibrating, and measuring a height value of a working tooth of the drill bit before drilling;

(2) obtaining a set load parameter value, particularly comprising steps of: controlling a feed amount of the diamond drill bit; finding out a load value K corresponding to a maximum feed amount of the diamond drill bit on a drilling object; and setting M=0.70K-0.85K, wherein M is the set load parameter value;

(3) during drilling, controlling a drilling load value of the diamond drill bit to be 0.90M-1.1M through a servo system, wherein the drilling load value fluctuates around the set load parameter value, so as to enable a drilling thrust to be flexibly constant and realize intelligent drilling; and (4) according to a drilling time, a tooth height consumption and a drilling depth, obtaining the performance of the diamond drill bit.

Before obtaining the set load parameter value, a mark is made on a circumference of the drill bit and serves as a measurement position of the tooth height consumption before drilling and after drilling.

When the drilling object is a reinforced concrete preform, it is required that the diamond drill bit can horizontally drill the rebar through every test drilling holes during test drilling.

When the drilling object is ceramic tile or marble, the orifice boundary effect is required to be observed.

During drilling, an overload resistance of the drill bit can be tested through continuously or intermittently increasing the feed amount.

Compared with the prior art, the present invention has following beneficial effects.

The test method provided by the present invention solves instability problem of the conventional manual feed method and meanwhile solves the test damage problem on the test object and the parameter inaccuracy problem of the manual measurement existing in the conventional rigid constant force cutting methods (such as the weight hanging feed method, the limited power (current) cutting test method and the constant value feed cutting test method), which not only realizes the intelligent cutting but also realizes the automatic measurement of various parameters, so that the working performances of the diamond saw blade, the diamond drill bit and the diamond grinding wheel can be accurately obtained. Therefore, a uniform and normative test standard is provided for the industry, which ensures the healthy development of the diamond tool industry.

The present invention is not only applicable to diamond tools (such as saw blade, drill bit and grinding wheel), but is also applicable to the performance test of the tools of other materials.

Figure 1:
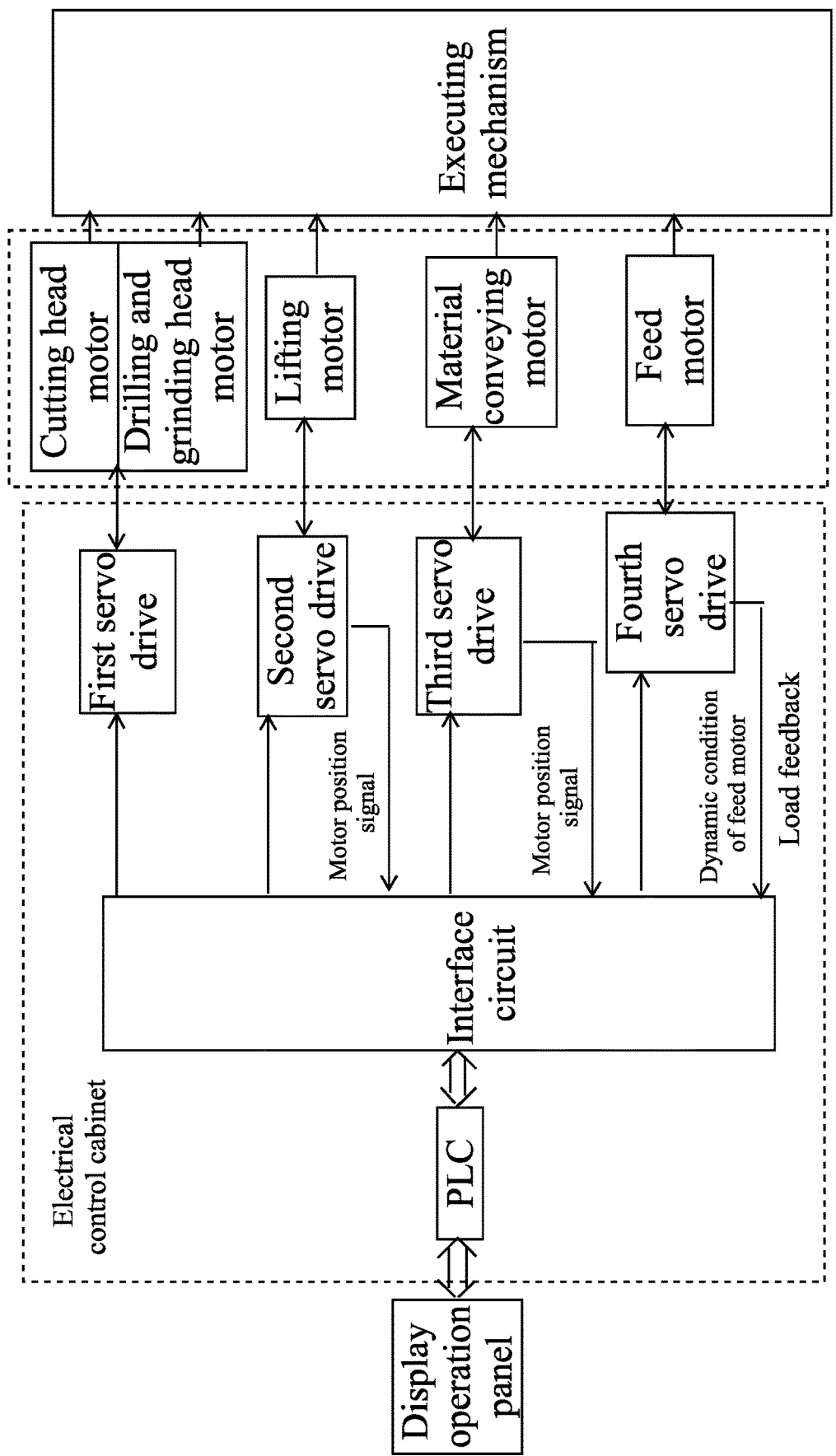
FIG. 1 is a logic block diagram of a servo control system according to a preferred embodiment of the present invention.

In figures: 1: standing column; 2: beam; 3: feed support; 4: feed driving device; 5: cutting power head; 6: drilling and grinding power head; 7: power head lifting mechanism; 8: material conveying sliding seat; 9: material conveying support; 10: material conveying driving mechanism; and 11: electric box.

DETAILED DESCRIPTION OF THE PREFERRED EMBODIMENT

The present invention is further described with the preferred embodiment. The described preferred embodiment is merely a part of the embodiments of the present invention, not all of the embodiments. Other embodiments obtained based on the preferred embodiment of the present invention by one skilled in the art without creative work are all encompassed within the protection range of the present invention.

A method for testing cutting performance of a diamond saw blade is provided.

During the cutting test, operators shall not work unless the operators wear protective glasses, dust masks and sound insulation earplugs. Except testers, no one can stand within 1.5 meters of an extended line of a rotation direction of the saw blade, so as to ensure personnel security during testing.

The method for testing the cutting performance of the diamond saw blade comprises steps of:

(1) starting a cutting machine, idling the cutting machine with a low speed, and ensuring that the cutting machine runs normally; wherein: generally, after the cutting machine is started, the cutting machine is idled for 5 minutes, and a feed mechanism runs simultaneously; and every motion mechanisms are ensured to work normally;

(2) according to a structure of the saw blade, selecting dry cutting (without cooling liquid) or wet cutting (with cooling liquid);

(3) arranging the diamond saw blade on the cutting machine, and ensuring that a rotation direction of the diamond saw blade is same as a rotation direction of a main shaft of the cutting machine;

(4) according to a function of the diamond saw blade, selecting an appropriate cutting object; arranging the selected cutting object on a material conveying table; and setting a material conveying distance; wherein: the cutting performance test of the saw blade is to cut a slab for n times (with a cutting depth equal to a thickness of completely penetrating through the slab), generally with a cycle of 30 times; after completing each time of cutting, the slab being cut moves forward and longitudinally by a certain distance (namely the set material conveying distance) for the next time of cutting; the specific material conveying distance is determined by the operators according to the specific cutting material and characteristics of the saw blade to be tested, with considering both of not generating breakage during cutting and having the minimum material waste; and, the determination of the material conveying distance is clear and understandable for one skilled in the art and thus is not described in detail;

(5) starting the cutting machine, manually feeding with a feed amount gradually increasing, and finding out a load value K corresponding to a maximum feed amount of the diamond saw blade; and setting M=0.70K-0.85K, wherein M is a set load parameter value; wherein: according to the preferred embodiment of the present invention, through setting the set load parameter value M, tooth burning due to the overload is avoided, and the limited performance of the saw blade due to the too small load is also avoided; therefore, through setting the set load parameter value M, the cutting performance of the diamond saw blade can be accurately obtained;

(6) when the diamond saw blade contacts the cutting object, starting timing and distance measurement at the same time; cutting until the saw blade leaves from the cutting object, and instantly ending timing and distance measurement; wherein: during cutting, a cutting load value of the diamond saw blade is controlled to be 0.9M-1.1M through a servo system; and that is to say, the cutting load value fluctuates around the set load parameter value, so as to enable a cutting thrust to be flexibly constant and realize the intelligent cutting; and (7) automatically measuring a consumption value of the working tooth and a cutting amount, and automatically timing; according to a cutting length and a cutting time, calculating a sharpness of the diamond saw blade; and, according to the cutting length and a consumed tooth height of the diamond saw blade during cutting, calculating a working life of the diamond saw blade.

The present invention can automatically measure and calculate the cutting parameters, thereby increasing the data accuracy.

As shown in FIG. 1, the servo control system provided by the present invention comprises a display operation panel, a programmable logic controller (PLC) and an executing mechanism, wherein the display operation panel is electrically connected with the PLC; the PLC is mounted in an electrical control cabinet; the PLC is electrically connected with an interface circuit; the executing mechanism is configured respectively with a cutting head motor, a drilling and grinding head motor, a lifting motor, a material conveying motor and a feed motor; the cutting head motor and the drilling and grinding head motor are connected with the interface circuit through a first servo drive; the lifting motor, the material conveying motor and the feed motor are respectively connected with the interface circuit through second, third and fourth servo drives; the second, third and fourth servo drives arranged for the lifting motor, the material conveying motor and the feed motor receive the signal outputted from the interface circuit and then dynamically feedback a position signal of the lifting motor, a position signal of the material conveying motor and a dynamic condition of the feed motor to the interface circuit; and then the motors are controlled by the PLC, so as to form a closed-loop control.

According to the present invention, because all of the motion mechanisms of the test machine are driven by the servo motors, during the cutting process of the saw blade, the dynamic values of parameters such as cutting current, torque, rotation speed and feed speed can be measured conveniently, accurately and rapidly. Moreover, parameters such as the rotation speed, power, feed amount and current can be arbitrarily selected to serve as the preconditions for measuring the variation of other elements. Because of the advantages of accuracy and flexibility, the test machine is suitable for serving as the test machine of the process technology development, which provides powerful testing means for the expansion of the cutting, drilling and grinding tools towards the high-tech field. The whole control, test and display control system as the unit module can be flexibly configured on the machine tools of various structures (more details thereof are described below) and can be applied in the cutting performance test of various cutting, drilling and grinding tools such as the diamond circular saw blade having a broad specification (including the sintering type, welding type and brazing type), the high-speed steel (HSS) saw blade, the hard alloy saw blade, the tungsten steel saw blade, the inserted-tooth alloy saw blade, the abrasion wheel, the grinding wheel and the drill bit.

Figure 2:
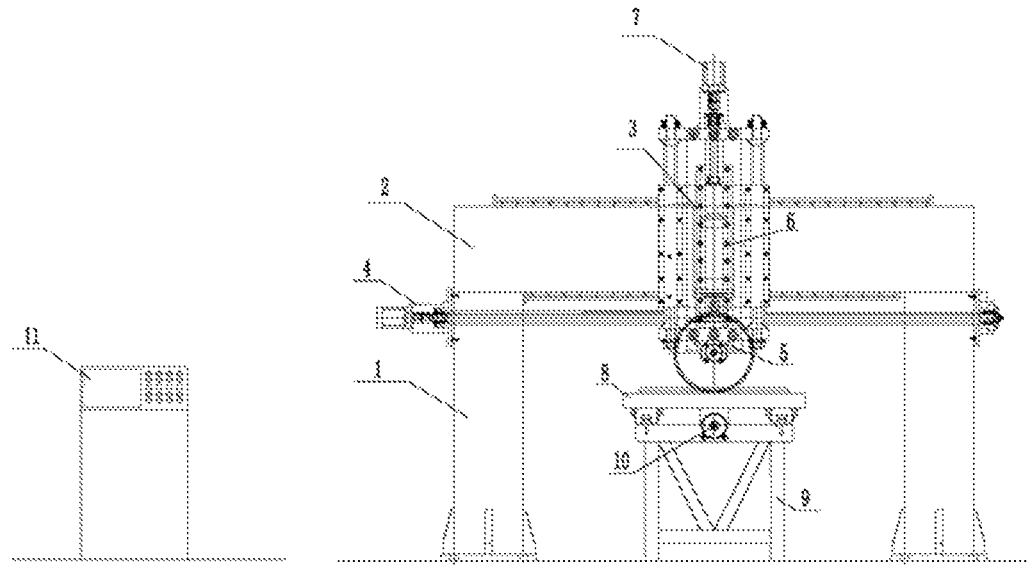
FIG. 2 is a front view of a fixed-beam-bridge cutting test machine according to the preferred embodiment of the present invention.
Figure 3:
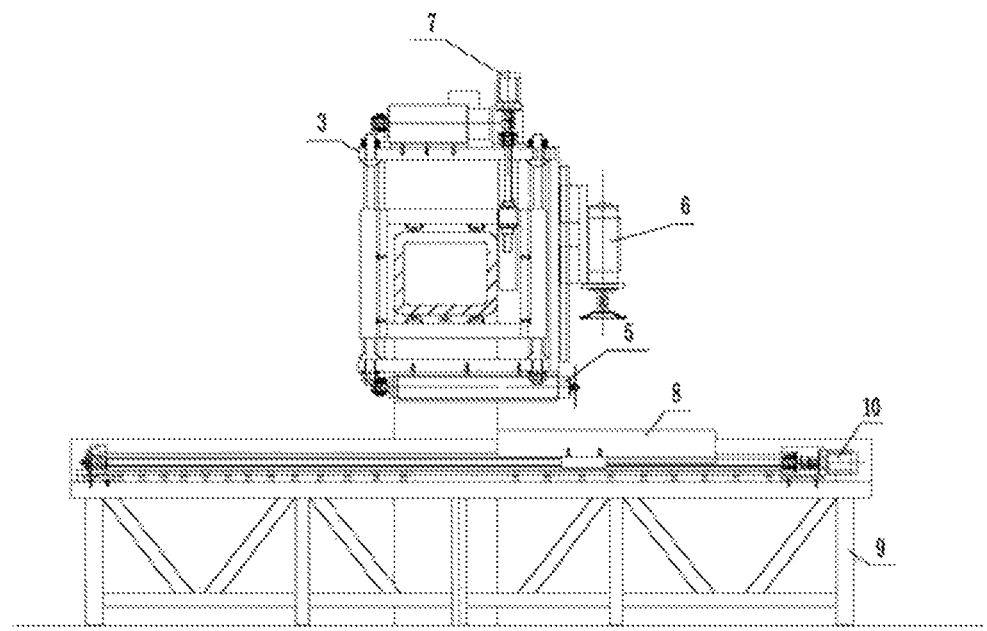
FIG. 3 is a side view of the fixed-beam-bridge cutting test machine shown in FIG. 2.

According to the preferred embodiment of the present invention, referring to FIG. 2 and FIG. 3, a fixed-beam-bridge cutting test machine comprises two standing columns 1, a beam 2, a feed support 3, a feed driving device 4, a cutting power head 5, a drilling and grinding power head 6, a power head lifting mechanism 7, a material conveying sliding seat 8, a material conveying support 9 and a material conveying driving mechanism 10, wherein: the two standing columns 1 are fixed on a bottom seat; the beam 2 is horizontally arranged on top parts of the two standing columns 1; the feed support 3 is arranged on the beam 2 through a linear guide rail pair and is provided with a horizontal feed power by the feed driving device 4; the cutting power head 5 and the drilling and grinding power head 6 are respectively arranged on a bottom surface and a front surface of the feed support 3; the material conveying support 9 is arranged below the cutting power head 5 and the drilling and grinding power head 6; the material conveying sliding seat 8 is arranged on the material conveying support 9 through the material conveying driving mechanism 10 and is provided with a longitudinal feed power by the material conveying mechanism 10; the feed driving device 4, the cutting power head 5, the drilling and grinding power head 6, the power head lifting mechanism 7 and the material conveying driving mechanism 10 are provided with power by respective servo motors; all of the servo motors are connected with an electric box 11; and the electric box 11 is configured with a human-machine interaction interface.

The fixed-beam-bridge cutting test machine is taken as an example as follows, so as to further describe the control process of the present invention, wherein a logic block diagram of the servo control system is showed in FIG. 1.

Figure 4:
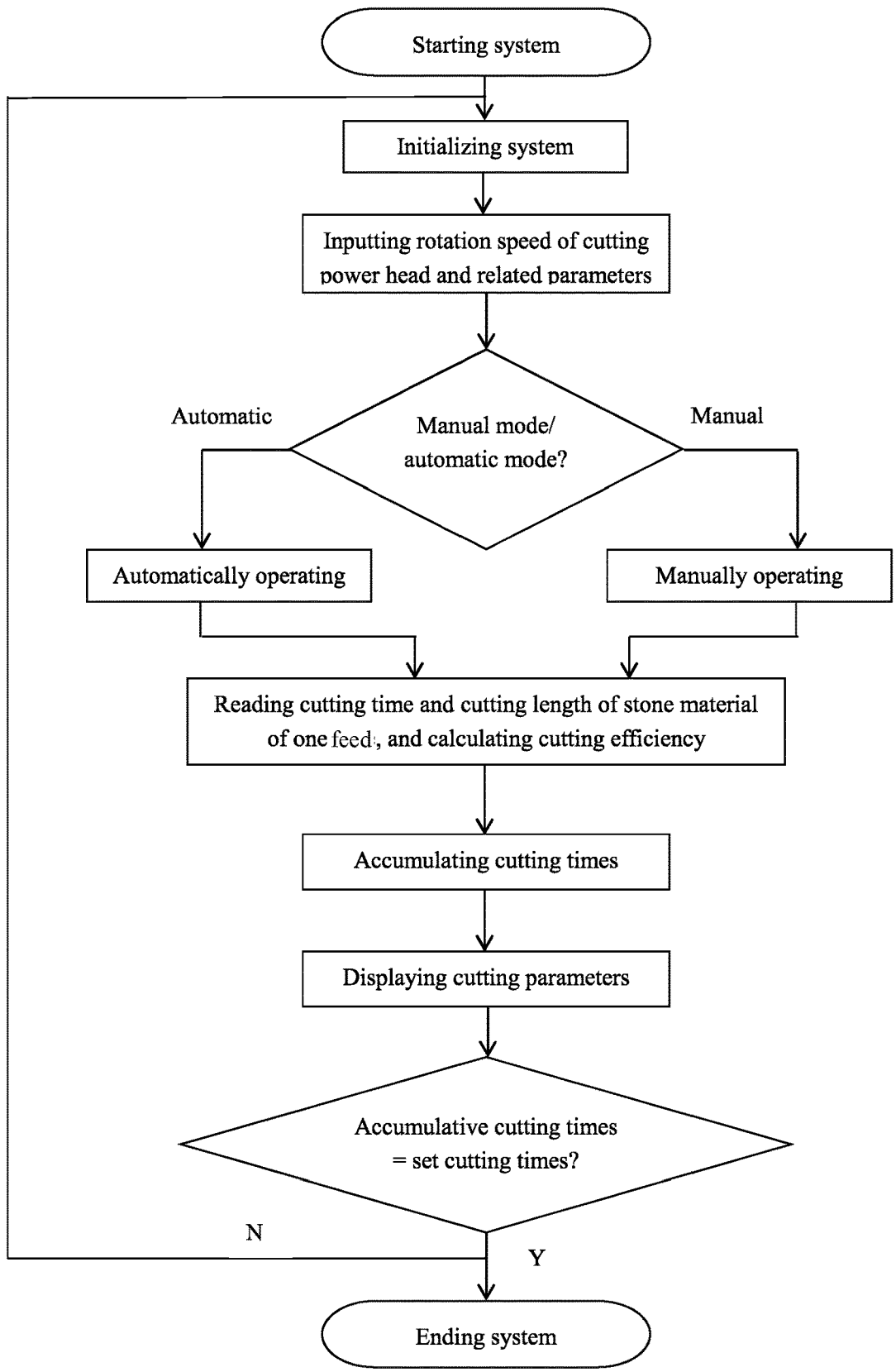
FIG. 4 is a logic block diagram of an operating system according to the preferred embodiment of the present invention.

Referring to a logic block diagram of an operating system shown in FIG. 4, the operating system has two modes, respectively a manual adjusting mode and an automatic working mode. After the test machine is started, a manual or automatic control button is selected to enter a corresponding working mode. If the manual mode is selected, the cutting power head motor, the feed motor, the feed support lifting motor, the material conveying motor, etc. can be adjusted and work independently, and positions thereof can be adjusted. If the automatic mode is selected, the machine will enter the automatic working process according to the set program. That is to say, the lifting motor is started and drives the feed support to move downward, so that the saw blade gradually approaches the working tooth height measurement device and the diameter of the saw blade before cutting is measured and recorded; the feed support moves upward by 5 mm, and then the material conveying motor is started, so as to complete material conveying with the specified material conveying distance; the power head motor is started; then the feed motor is started and completes an automatic cutting process according to steps of: moving forward quickly; approaching slowly with a decreased speed; cutting with a constant force; returning back; and displaying calculation. If the cutting process needs to be repeated, the cutting process proceeds according to the setting.

Figure 5:
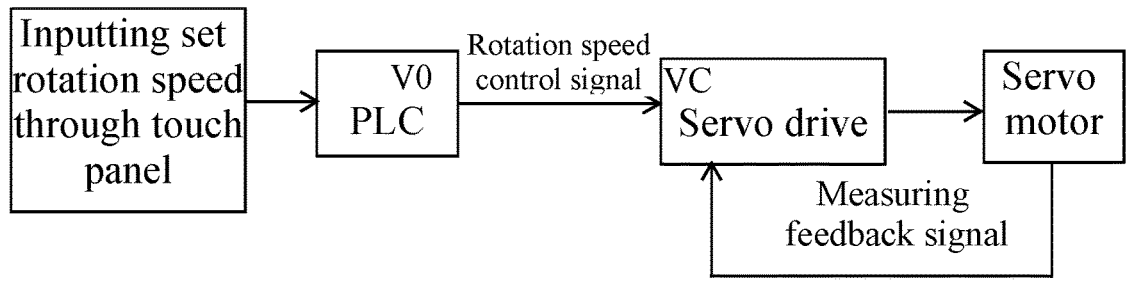
FIG. 5 is a sketch view of control principles of a cutting power head according to the preferred embodiment of the present invention.

A cutting power head for cutting stone material is taken as an example. The power head requires a high power output and has an output rotation speed can be adjusted through the PLC. Moreover, the power head has a working rotation speed ranging between 3000-15000 rpm and a precision of ±5 rpm. The test machine adopts a high-speed servo motor drive system of 5.5 KW, and control principles are showed in FIG. 5. The information about the rotation speed is inputted into the PLC through the touch panel; after calculation, an interface (V0) of an analog expansion module of the PLC outputs a rotation speed control signal to an analog input interface (VC) of the servo drive, thereby adjusting the rotation speed of the servo motor. The cutting power head can be selected to work with a constant power or a constant rotation speed; the working parameters can be displayed and recorded at the right time, and can serve as the modulation signal source when necessary, so as to facilitate the simulation of the rotation speed and power conditions of the various user cutting machines.

In order to prevent the tool from being damaged when cutting in, the feed mechanism is required to avoid the impact cut-in. During cutting, the feed mechanism works according to the steps of: moving forward quickly; approaching slowly with the decreased speed; and cutting with the constant force. During the cutting process of the stone material, the constant force cutting is required, which is realized through setting a limiting value of the motor output torque. When the load has a change, the thrust is adjusted through changing the rotation speed of the motor, so as to enable the load to be constant. Because the above method dynamically feedbacks the cutting load (namely test feed motor current) and controls the feed speed, the cutting test realizes the intelligent cutting. During the cutting process, according to the structure hardness change of the cutting object and the performance change of the saw blade, the test machine can enable the saw blade to be cut still under the reasonable load condition until the whole test process is completed. If necessary, the whole working layer of the tested sample can be consumed, so that the working performance of the whole tooth is observed and the test error becomes smaller. Through controlling the cutting load, the saw blade is ensured to be cut constantly under the set load condition, which not only solves the difference problem of the different operators when manually feeding but also avoids the abnormal tooth burning of the saw blade due to the hardness difference of the stone material. The above process relates to the two elements of object and feed thrust in the three cutting elements.

If the own sharpness of the saw blade is good, the load during cutting is relatively small. If the comparison value with the set load parameter value M is a negative value, the test machine will automatically increase the feed speed and show the relatively high efficiency value. If the own sharpness of the saw blade is poor, the load during cutting is relatively large. If the comparison value with the set load parameter value M is a positive value, the test machine will automatically decrease the feed speed and show the relatively low efficiency value.

Figure 6:
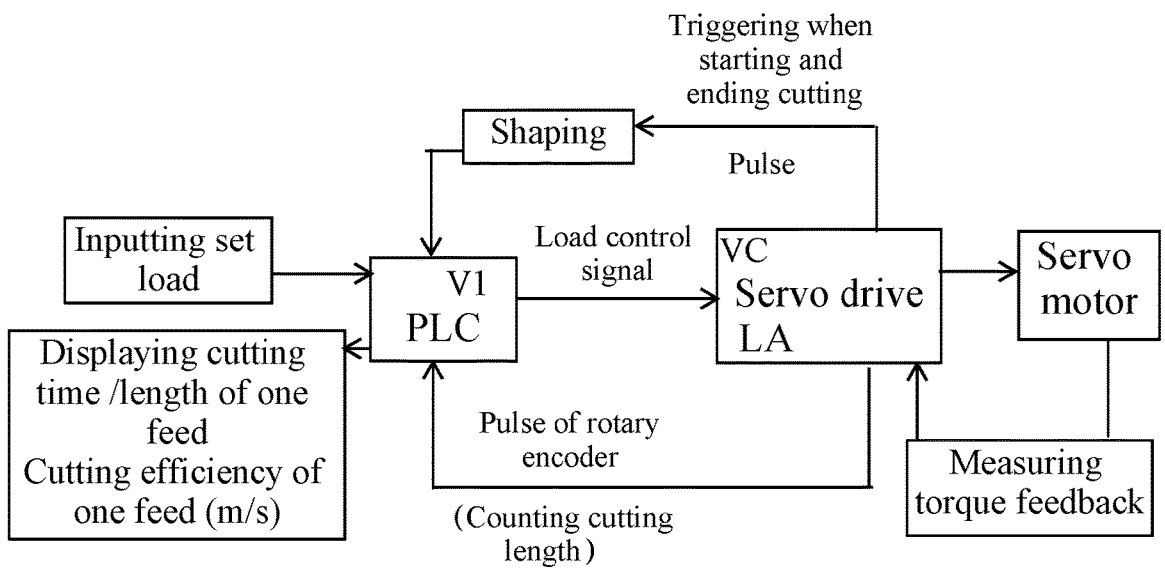
FIG. 6 is a sketch view of control principles of a feed mechanism according to the preferred embodiment of the present invention.
Figure 7:
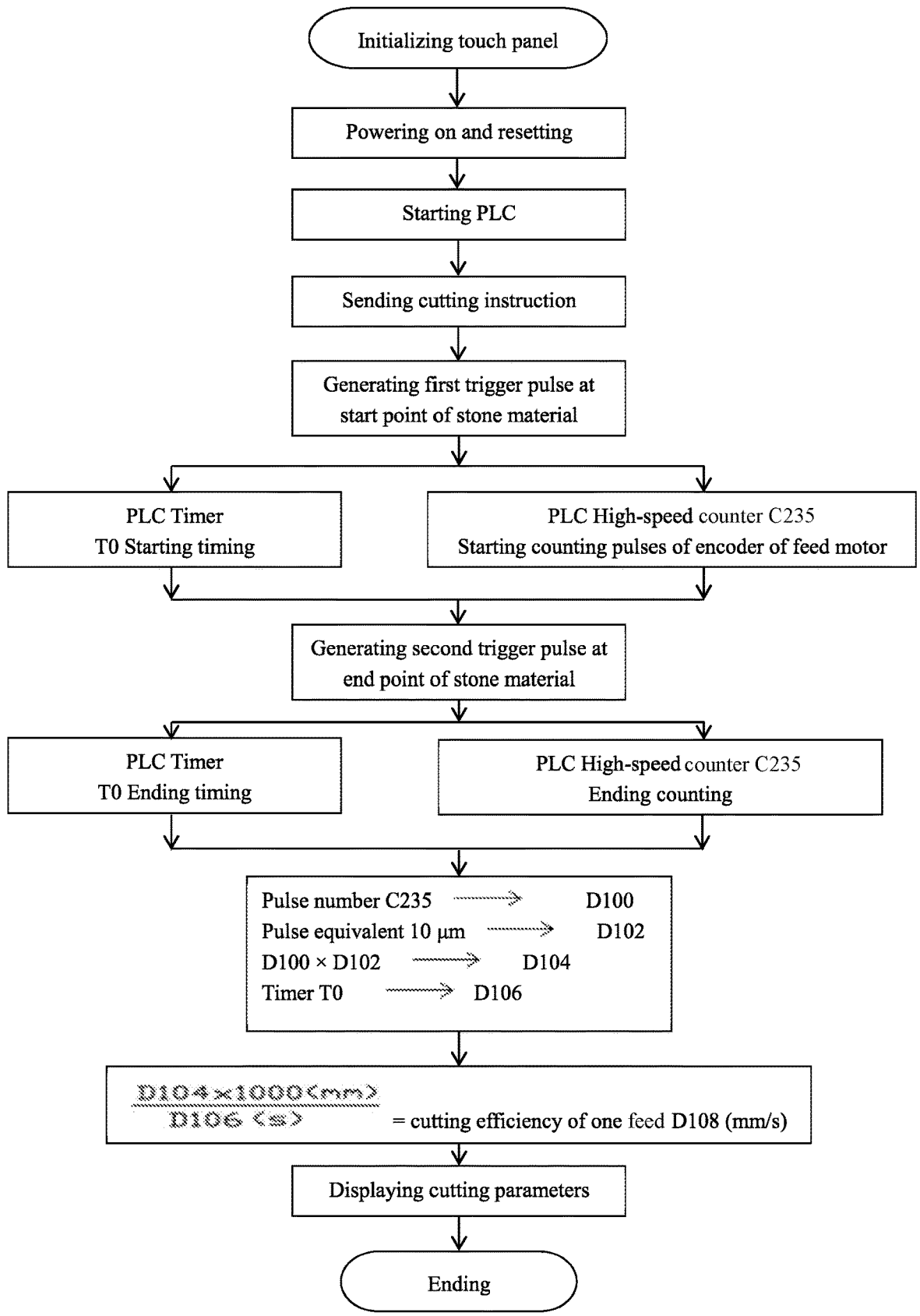
FIG. 7 is a program control flow chart of a programmable logic controller (PLC) according to the preferred embodiment of the present invention.

The detailed control process is showed in FIG. 6. The set cutting load is a load obtained through outputting the load control signal to the analog input interface (VC) of the servo drive by the analog output interface (V1) of the PLC, for controlling the load of the servo drive. The cutting time is automatically measured by the timer inside the PLC. When the saw blade contacts the stone material, the servo drive generates a first trigger pulse; after shaping, the timer in the PLC is triggered to start timing. When the saw blade cuts the tail end of the stone material and then leaves from the stone material, the servo drive generates a second trigger pulse; after shaping, the timer in the PLC is triggered to end timing, and the current value of the timer is stored in the data storage of the PLC. The cutting length is obtained through automatically counting the pulse of the rotary encoder of the servo motor by the timer inside the PLC, and then is stored in the data storage. The program control flow chart of the PLC is showed in FIG. 7.

The calculation formula of the cutting length in the PLC is:

cutting length($L$)=pulse equivalent($a$)×pulse number ($c$), wherein: the pulse equivalent ($a$) is a movement distance of the feed servo motor when the rotary encoder outputs one pulse; and the pulse number ($c$) is the pulse number outputted by the rotary encoder when the feed servo motor cuts the stone material.

The calculation formula of the cutting efficiency (m/s) of one feed is:

cutting efficiency $\eta$ of one feed (m/s)=cutting length $L$ (m)/cutting time $\tau$ (s).

For the material conveying mechanism, the material conveying size of cutting of each time is set through the display operation panel (namely the human-machine interaction interface); when the feed servo motor completes cutting the stone material of one time, the feed support quickly returns back to the start point and triggers the material conveying servo motor to complete the thrust material conveying of one time according to the set material conveying distance (namely the movement size of the stone material). Through the above function of material conveying according to the preset program, the automation of the cutting test is realized.

The present invention skillfully establishes the dynamic closed-loop servo mode of the cutting process, thereby modulating the feed speed timely, stabilizing the cutting load and being self-adaptive to the condition change due to the uneven cutting material structure and the uneven own performances of the saw blade working tooth, so that the saw blade works in the optimal state, the intelligent cutting is realized and the accurate performance of the diamond saw blade is obtained. Through applying the modern information grouping concept, the alternating current servo motor and the PLC form the accurate, sensitive and reliable control and test system, which not only realizes the flexible intelligent cutting test but also solves the problem of great difference of manual feeding.

The present invention has the scientific conception, smart design, compatibility of functionality and accuracy, wide application range and various variant types, and is applicable to the cutting performance test of various cutting, drilling and grinding tools.

The present invention automatically measures the various parameters, automatically adapts to the condition change due to the uneven structure of the cutting object and the uneven own performance of the saw blade, automatically adjusts the feed speed for avoiding tooth burning and realizes the intelligent cutting test.

The present invention adopts the cutting test way of testing for n×100 times, so as to eliminate the random error.

The present invention can select the mode with the constant load, the constant rotation speed or the constant thrust (feed speed) and scientifically simulate the parameters of the various cutting machines, so as to realize the standardized test of the cutting performances of the cutting, drilling and grinding tools and fill the domestic blank.

The present invention can arbitrarily adjust the principal and subordinate parameters and measure the variation of other elements. Because the advantages of accuracy and flexibility, the present invention is suitable for serving as the test machine of the process technology development, which provides powerful testing means for the expansion of the cutting, drilling and grinding tools towards the high-tech field.

The present invention can establish the database of the cutting performances of the cutting, drilling and grinding tools, which provides the data support for completing the technology standard of China and the industry.

The present invention realizes the automatic material conveying, intelligent cutting and automatic measurement, so that the labor strength of the operators is greatly decreased.

The test method provided by the present invention solves the instability problem of the conventional manual feed method and meanwhile solves the test damage problem on the test object and the parameter inaccuracy problem of the manual measurement existing in the conventional rigid constant force cutting methods (such as the weight hanging feed method, the limited power (current) cutting test method and the constant value feed cutting test method), which not only realizes the intelligent cutting but also realizes the automatic measurement of various parameters, so that the working performances of the diamond saw blade, the diamond drill bit and the diamond grinding wheel can be accurately obtained. Therefore, a uniform and normative test standard is provided for the industry, which ensures the healthy development of the diamond tool industry.

The test of the cutting performance of the saw blade is taken as an example as follows, and the operation steps are described briefly.

The type of the sample to be tested: G230×7×2.5×25 mid-range granite cutting blade.

The parameters of the cutting object: 664 granite 1200× 630×20 (length×width×thickness).

The cutting way: dry cutting. The selection of the cutting way is clear and understandable for one skilled in the art and thus is not described in detail.

The simulation cutting machine: the alternating current bench machine with a rotation speed of 4500 rpm and a power of 3.5 KW.

The detailed operation comprises steps of:

(1) starting the power supply of the test machine, starting the host control and test recording system, and idling the machine for 5 minutes; and meanwhile checking whether every parts of the machine run normally;

(2) after confirming that the function of the machine is normal, arranging the saw blade to be tested on the main shaft of the cutting power head; compressing the flange plate, and closing the shield door;

(3) arranging the stone slab on the material conveying table, and meanwhile verifying whether the pneumatic locking function is effective;

(4) according to the requirements, testing through the alternating current bench machine with a constant rotation speed; and in the human-machine interface of the test machine, setting the related cutting parameters; wherein: the rotation speed is set to be 3000 rpm; the load coefficient (presetting according to the mid-range 230 granite saw blade) is set to be 10; the feeding depth is set to be 25 mm; the feed amount is set automatically; the cutting length of one feed is set to be 650 mm; the material conveying distance is set to be 7 mm; the cutting mode is set to be the A mode; the set load parameter value is not set; and the total cutting times is set to be 100;

(5) starting the cutting machine, and automatically calibrating by the machine; and measuring the height value of the working tooth of the saw blade before cutting;

(6) finding out a maximum load value K of the tested saw blade, particularly comprising steps of: starting the main shaft, and rotating the electronic hand wheel, so that the feed mechanism works according to three steps of moving forward quickly, approaching slowing and cutting; after the tooth of the saw blade contacts the stone material, gradually increasing the feed amount until fire ring occurs at the tooth edge of the saw blade, and instantly ending feeding; wherein the load at the moment of occurring the fire ring is the maximum load value K of the saw blade; setting M=0.70K-0.85K; after inputting the set load value, setting the cutting mode to be the B mode, and entering the automatic cutting program;

(7) during the cutting test, after completing 100 times of cutting, instantly ending cutting; automatically calculating the sharpness and the working life of the saw blade by the machine; and completing a cutting test cycle;

(8) after correctly inputting the verification parameters, pressing the start button; wherein: five windows are arranged on the operation interface; the first window is a cutting efficiency dynamic display curve window of the tested cutting, drilling and grinding tool, and the actual cutting efficiency of every time of cutting is displayed; the second window is a parameter window of the tested cutting, drilling and grinding tool, and the geometrical parameters of the tested cutting, drilling and grinding tool is displayed; the third window is a manual adjusting window with which the test parameters can be easily set and the machine can be adjusted easily; the fourth window is a cutting test parameters setting/display window; and the fifth window is a historical data summary display window; and (9) according to the cutting length and the cutting time, calculating the sharpness of the diamond saw blade; according to the cutting length and the consumed height of the diamond saw blade during cutting, calculating the working life of the diamond saw blade; wherein: the sharpness (M/min) is a cut-in length of the tested sample per unit time; and the working life (M/mm) is a length of the material being cut by the consumed height of the working tooth of the saw blade.

In order to avoid the test being interfered due to the blocked debris, a cutting depth is required to be larger than a thickness of the cutting object by 2 mm, so as to facilitate removing the debris.

The accumulative test cutting length of the diamond saw blade is required to be no less than 10 m; and the cutting time during manual feeding is not involved in calculation of the sharpness.

According to the present invention, the cutting object can be the concrete, ceramic tile, glass material, natural granite, marble, artificial building slab and other materials. The test parameters of the cutting object are preferred to be determined by the interested party, and can be completely or partly selected from the international standard, national standard or other documents related to the cutting object. It is recommended to select concrete, ceramic tile, and natural granite building slab, meeting following standards, to serve as the cutting object. The standards are respectively: GB 50204-2015, *Code for quality acceptance of concrete structures construction*; GB/T 4100-2015, *Ceramic tiles*; and GB/T 18601-2009, *Natural granite for building slab*.

If a comparison test is made for testing the cutting performances of more than two diamond saw blades, the saw blades should be tested on the same slab for 5-10 times, so as to further eliminate the interference of the stone material.

When the cutting object is ceramic tile or marble, the residual tailing and boundary effect should be observed. The residual tailing is a tailing left on a tail end of the slab after cutting; and the boundary effect is a defect degree of the boundary angle between the cutting surface and the upper surface of the cutting material after cutting.

During cutting, an overload resistance of the diamond saw blade can be tested through continuously or intermittently increasing the feed amount.

The present invention is also applicable to the performance test of the diamond grinding wheel and the diamond drill bit. The test principles of the diamond grinding wheel and the diamond drill bit are same as that of the diamond saw blade. That is to say, the machine is started and calibrated automatically, and the height value of the working tooth of the saw blade before cutting is measured; the maximum load value K is found out through steps of: starting the main shaft; rotating the electronic hand wheel; adjusting the feed speed from low to high; and finding out the load value K corresponding to the maximum feed amount of the diamond grinding wheel and drill bit on the cutting object; then M is set to be 0.70K-0.85K, wherein M is the set load parameter value; during the test, the cutting load of the tool is controlled to be 0.90M-1.1M through the servo system, namely the load of the tool is controlled to slightly fluctuate around the set load parameter value M through the servo system, so as to enable the thrust to be flexibly constant; and finally, the performance of the tool is calculated according to the obtained test data.

The method for testing the grinding performance of the diamond grinding wheel is provided. The operators of the grinding test shall not work unless the operators wear the protective glasses, dust masks and sound insulation earplugs.

The grinding wheel is firstly started and idled with a low speed for 5 minutes (the feed mechanism run simultaneously), and every parts are ensured to run normally.

According to the structure of the grinding wheel, the dry grinding (without the cooling liquid) or wet grinding (with the cooling liquid) is selected.

The method comprises steps of:

(1) calibrating automatically, and measuring the height value of the working tooth of the grinding wheel before grinding;

(2) obtaining the set load parameter value, particularly comprising steps of: feeding by the feed mechanism according to the set feeding depth of one feed; rotating the electronic had wheel; adjusting the feed amount from low to high; finding out the load value K corresponding to the maximum feed amount of the diamond grinding wheel on the grinding object; and setting M=0.70K-0.85K, wherein M is the set load parameter value;

(3) during grinding, controlling the grinding load value of the diamond grinding wheel to be 0.9M-1.1M through the servo system, namely the grinding load value fluctuates slightly around the set load parameter value M, so as to enable the grinding thrust to be flexibly constant and realize the intelligent grinding; and (4) automatically measuring the consumption value of the working tooth and the grinding amount, and automatically timing; according to the grinding volume and grinding time of the grinding object, obtaining the grinding sharpness of the diamond grinding wheel; and, according to the grinding volume of the grinding object and the consumed value of the tooth height of the grinding wheel after grinding, obtaining the working life of the diamond grinding wheel.

The detailed operations are described as follows.

Firstly, the machine is calibrated automatically, and the height value of the working tooth of the grinding wheel before grinding is measured.

Before obtaining the set load parameter value, a mark is made on the circumference of the grinding wheel and serves as a measurement position of the tooth height consumption before grinding and after grinding. The grinding object is arranged and fixed on the material conveying table; then the start button is pressed; the grinding wheel enters the calibration program; the feed mechanism drives the grinding wheel to move vertically; after the grinding wheel contacts the grinding object, the depth scale (Xq1) is recorded; meanwhile, after the depth probe moves and contacts the grinding object, the scale of the depth probe returns to zero to serve as the feed start position (Hq); then the depth probe returns back, and the calibration is completed.

Secondly, the set load parameter value M is obtained through steps of: starting and rotating the main shaft; feeding by the feed mechanism according to the set feeding depth of one feed; rotating the electronic had wheel; adjusting the feed speed from low to high; finding out the load value K corresponding to the maximum feed amount of the diamond grinding wheel on the grinding object; and setting M=0.70K-0.85K, wherein M is the set load parameter value.

Thirdly, during grinding, the grinding load value of the diamond grinding wheel is controlled to be 0.9M-1.1M through the servo system, namely the grinding load value fluctuates slightly around the set load parameter value M, so as to enable the grinding thrust to be flexibly constant. The feed mechanism feeds according to the set feeding depth of one feed and grinds the grinding object with feeding in an "S" shape circularly, and the grinding completion time is recorded automatically. That is to say, during grinding, the grinding wheel first feeds from left to right horizontally; when the grinding wheel contacts the end of the slab, the grinding wheel is moved longitudinally for a certain distance and then feeds from right to left horizontally, wherein the longitudinal movement distance should be between 80-90% of the width of the diameter of the grinding wheel; the above process is repeated until completing grinding. According to the grinding material, the feed amount of one feed of the vertical feed mechanism is set; after completing feeding of each time, the whole surface is required to be ground once before feeding again. After reaching the set total grinding depth, a grinding cycle is completed, and the grinding completion time is recorded.

Fourthly, after completing the set accumulative grinding depth, the grinding test automatically enters the measurement program for measuring the working tooth consumption and the grinding material removal amount. The feed mechanism firstly returns back to the start position and then drives the grinding wheel to move; after the grinding wheel contacts the grinding object, the depth scale value (Xh1) is recorded; and meanwhile, the depth probe moves to successively contact four angular points of the grinding object and respectively records scale values for calculating an average value of the scale values of the depth probe, so that a depth removal value (Hh) of the grinding material after grinding is obtained; the depth probe returns back, and the measurement is completed. According to the grinding volume (slab area× thickness difference measured before grinding and after grinding) of the grinding object and the grinding time, the grinding sharpness is obtained. According to the grinding volume of the grinding object and the consumed tooth height of the grinding wheel after grinding, the working life of the grinding wheel is obtained. The calculation formulas are described as follows.

The calculation formula of the material removal amount (Vm) after grinding:

$(Hq-Hh) \times L \times W$ (unit: cm³).

The calculation formula of the consumed tooth height (X) of the grinding wheel:

$(Xh1-Xq1)-(Hq-Hh)$ (unit: mm).

The calculation formula of the sharpness of the grinding wheel (cm³/min): material removal amount after grinding/total grinding time.

The calculation formula of the working life of the grinding wheel (cm³/mm): material removal amount after grinding/consumed tooth height.

If the comparison test is made for testing the grinding performances of two stone grinding wheels, besides respectively testing the grinding performance of each grinding wheel as described above, the grinding wheels are required to grind the same material for 1-2 cycles with the same grinding parameters, so as to further eliminate the interference of the material structure difference of the grinding object.

When necessary, the test of the overload resistance of the grinding wheel can be added. Though continuously or intermittently increasing the feed amount during grinding, the overload resistance of the grinding wheel is observed. The test of the overload resistance should be processed after completing the normal grinding test.

The grinding object is preferred to be a grinding object having the regular edge, and the grinding object can be the concrete, ceramic tile, glass material, natural granite, marble, artificial building slab and other materials.

The method for testing the drilling performance of the diamond drill bit is provided. The operators of the drilling test shall not work unless the operators wear the protective glasses, dust masks, sound insulation earplugs and the insulating waterproof boots. The drilling machine should be checked; the height of the working tooth of the drill bit to be tested should be checked and measured; the drill bit is mounted on the drilling machine tightly; the drilling cooling way is selected according to the structure of the drill bit to be tested; according to the diameter and function features of the drill bit to be tested, the rotation speed of the drill bit is set; according to the function of the drill bit to be tested, the drilling object is selected and is ensured to be arranged firmly.

The method comprises steps of:

(1) obtaining the set load parameter value, particularly comprising steps of: manually controlling the feed amount of the diamond drill bit; finding out the load value corresponding to the maximum feed amount of the diamond drill bit on the drilling object; and setting M=0.70K-0.85K, wherein: K is the load value corresponding to the maximum feed amount of the diamond drill bit during manual feeding; and M is the set load parameter value of the drilling test;

(2) during drilling, the load value of the diamond drill bit is controlled to be 0.9M-1.1M through the servo system; and (3) according to the drilling time, the consumed tooth height and the drilling depth, obtaining the performance of the diamond drill bit.

The detailed steps are described as follows.

Firstly, the height of the working tooth before drilling and after drilling is automatically measured. That is to say, before obtaining the set load parameter value, the calibration is required; and, after completing the test drilling cycle, the consumption value of the working tooth of the drill bit is automatically measured, so as to evaluate the working life of the drill bit. Particularly, the drill bit is mounted tightly, and a point is marked on the circumference of the drill bit and serves as the measurement position of the tooth height consumption before drilling and after drilling. The start button is pressed; then the measurement device moves to a position below the working tooth of the drill bit; the feed mechanism moves downward slowly, so as to enable the working tooth of the drill bit to enter the measurement position; the height value (Xq2) of the working tooth before drilling is measured; the feed mechanism returns back quickly, and the measurement device returns.

Secondly, in order to obtain the set load parameter value M, the drilling machine is started; the electronic hand wheel is rotated for adjusting the feed speed of the drill bit; the feed mechanism works according to three steps of moving forward quickly, approaching slowing and cutting; the feed amount is gradually increased during drilling, so as to increase the drilling load, and then the load value K corresponding to the maximum feed amount of the drill bit is found out; and M is set to be 0.70K-0.85K, wherein M is the set load parameter value. During drilling, the load value of the diamond drill bit is controlled to be 0.9M-1.1M through the servo system; that is to say, the drilling load value fluctuates slightly around the set load parameter value M, so as to enable the drilling thrust to be flexibly constant.

Thirdly, after completing the preset drilling test amount (drilling number), the drill bit returns; the measurement device moves to the position below the working tooth of the drill bit; the feed mechanism moves downward slowly, so as to enable the working tooth of the drill bit enter the measurement position, and the height value (Xh2) of the working tooth after drilling is measured; the feed mechanism returns back quickly, and the measurement device returns, so as to complete the preset drilling cycle.

Fourthly, according to the drilling time, the consumed tooth height and the drilling depth, the performance of the diamond drill bit is obtained.

When the drilling object is a reinforced concrete preform, it is required that the diamond drill bit is able to horizontally drill the rebar through every test drilling holes during test drilling.

When the drilling object is ceramic tile or marble, the orifice boundary effect is required to be observed.

When necessary, the test of the overload resistance of the drill bit can be added; through continuously or intermittently increasing the feed amount during drilling, the overload resistance of the drill bit is observed; the test of the overload resistance should be processed after completing the normal drilling test.

If the comparison test is made for testing the drilling performances of two stone drill bits, besides respectively testing the drilling performance of each drill bit as described above, the drill bits are required to drill one or two holes on the same material with the same drilling parameters, so as to further eliminate the interference of the material structure difference of the drilling object.

The sharpness (m/min) of the diamond drill bit is calculated as follows. The drilling depth and time of each hole are accumulated; then through dividing the total depth by the total drilling time, the sharpness of the drill bit is obtained. The working life (m/mm) of the diamond drill bit is calculated as follows. Through dividing the accumulative total drilling depth by the total height consumption value of the working tooth of the drill bit, the working life of the working tooth of the drill bit is obtained.

The test method provided by the present invention solves the instability problem of the conventional manual feed method and meanwhile solves the test damage problem on the test object and the parameter inaccuracy problem of the manual measurement existing in the conventional rigid constant force cutting methods (such as the weight hanging feed method, the limited power (current) cutting test method and the constant value feed cutting test method), which not only realizes the intelligent cutting but also realizes the automatic measurement of various parameters, so that the working performances of the diamond saw blade, the diamond drill bit and the diamond grinding wheel can be accurately obtained. Therefore, a uniform and normative test standard is provided for the industry, which ensures the healthy development of the diamond tool industry.

The present invention can be applied not only in the diamond tools (such as the saw blade, drill bit and grinding wheel), but also in the performance tests of the tools of other materials.

What is claimed is:

1. A method for testing cutting performance of a diamond saw blade, comprising steps of:
    (1) obtaining a set load parameter value, particularly comprising steps of: controlling a feed amount of the diamond saw blade; finding out a load value K corresponding to a maximum feed amount of the diamond saw blade on a cutting object; and setting M=0.70K-0.85K, wherein M is the set load parameter value;
    (2) during cutting, controlling a cutting load value of the diamond saw blade to be 0.90M-1.1M through a servo system; and
    (3) according to a cutting length and a cutting time, calculating a sharpness of the diamond saw blade; and, according to the cutting length and a consumed tooth height of the diamond saw blade during cutting, calculating a working life of the diamond saw blade.

2. A method for testing grinding performance of a diamond grinding wheel, comprising steps of:
    (1) obtaining a set load parameter value, particularly comprising steps of: controlling a feed amount of the diamond grinding wheel; finding out a load value K corresponding to a maximum feed amount of the diamond grinding wheel on a grinding object; and setting M=0.70K-0.85K, wherein M is the set load parameter value;
    (2) during grinding, controlling a grinding load value of the diamond grinding wheel to be 0.90M-1.1M through a servo system; and
    (3) according to a grinding volume and a grinding time of the grinding object, obtaining a grinding sharpness of the diamond grinding wheel; and, according to the grinding volume of the grinding object and a consumption value of a tooth height of the grinding wheel after grinding, obtaining a working life of the diamond grinding wheel.

3. The method for testing the grinding performance of the diamond grinding wheel, as recited in claim 2, wherein: before obtaining the set load parameter value, a mark is made on a circumference of the grinding wheel and serves as a measurement position of tooth height consumption before grinding and after grinding.

4. The method for testing the grinding performance of the diamond grinding wheel, as recited in claim 2, wherein: before starting grinding, the grinding object is arranged and fixed on a material conveying table; after the diamond grinding wheel is controlled to contact the grinding object, a depth probe is put down and contacts the grinding object; a scale of the depth probe returns to zero to serve as a feed start position; then the depth probe returns back; during grinding, the diamond grinding wheel grinds the grinding object with feeding in an "S" shape circularly, and a grinding completion time is recorded.

5. The method for testing the grinding performance of the diamond grinding wheel, as recited in claim 4, wherein: after completing grinding, the depth probe is put down again and contacts the grinding object; and meanwhile, the depth probe moves to successively contact multiple points of the grinding object for calculating an average value of scale values of the depth probe, so as to obtain a depth removal value of the grinding object.

6. A method for testing drilling performance of a diamond drill bit, comprising steps of:
    (1) obtaining a set load parameter value, particularly comprising steps of: controlling a feed amount of the diamond drill bit; finding out a load value K corresponding to a maximum feed amount of the diamond drill bit on a drilling object; and setting M=0.70K-0.85K, wherein M is the set load parameter value;
    (2) during drilling, controlling a drilling load value of the diamond drill bit to be 0.90M-1.1M through a servo system; and
    (3) according to a drilling time, a tooth height consumption and a drilling depth, obtaining the performance of the diamond drill bit.

7. The method for testing the drilling performance of the diamond drill bit, as recited in claim 6, wherein: before obtaining the set load parameter value, a mark is made on a circumference of the drill bit and serves as a measurement position of tooth height consumption before drilling and after drilling.

8. The method for testing the drilling performance of the diamond drill bit, as recited in claim 7, wherein: when the drilling object is a reinforced concrete preform, it is required that the diamond drill bit is able to horizontally drill rebar through every test drilling holes during test drilling.

9. The method for testing the drilling performance of the diamond drill bit, as recited in claim 6, wherein: when the drilling object is ceramic tile or marble, an orifice boundary effect is required to be observed.

10. The method for testing the drilling performance of the diamond drill bit, as recited in claim 6, wherein: during drilling, an overload resistance of the drill bit is able to be tested through continuously or intermittently increasing the feed amount.

* * * * *